United States Patent [19]

Lederman

[11] Patent Number: 4,830,157

[45] Date of Patent: May 16, 1989

[54] TEMPERATURE COMPENSATING ROLLER CLUTCH AND CAGE

[75] Inventor: Frederick E. Lederman, Sandusky, Ohio

[73] Assignee: General Motors Corporation, Detroit, Mich.

[21] Appl. No.: 106,475

[22] Filed: Oct. 9, 1987

[51] Int. Cl.$^4$ .............................................. F16D 41/06
[52] U.S. Cl. ....................................... 192/45; 384/557; 384/576
[58] Field of Search ................ 192/41 A, 44, 45, 45.1; 188/82.8, 82.84; 384/557, 576, 905

[56] References Cited

U.S. PATENT DOCUMENTS

| | | | |
|---|---|---|---|
| 3,500,977 | 3/1970 | Gehrke | 192/45 |
| 3,917,036 | 11/1975 | Johnson et al. | 192/45 |
| 4,054,192 | 10/1977 | Johnson | 192/45 |
| 4,570,762 | 2/1986 | Husmann | 188/82.84 |
| 4,679,676 | 7/1987 | King et al. | 192/45 |
| 4,712,661 | 12/1987 | Lederman et al. | 192/45 |

FOREIGN PATENT DOCUMENTS 2719685  11/1978  Fed. Rep. of Germany.

Primary Examiner—Rodney H. Bonck
Assistant Examiner—Richard M. Lorence
Attorney, Agent, or Firm—Patrick M. Griffin

[57] ABSTRACT

A cage for a roller clutch is molded of one piece, but still compensates for the divergence between its size and the size of the annular space between the clutch races that can occur with a temperature change. The cage is made up of a series of structurally complete retention pockets joined to one another at an even number of axially alternating flexible hinge points.

3 Claims, 2 Drawing Sheets

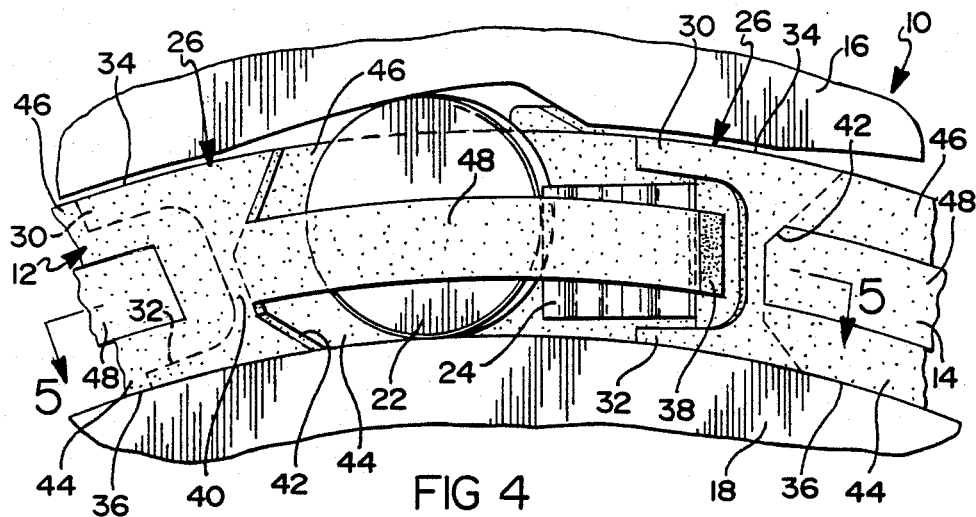
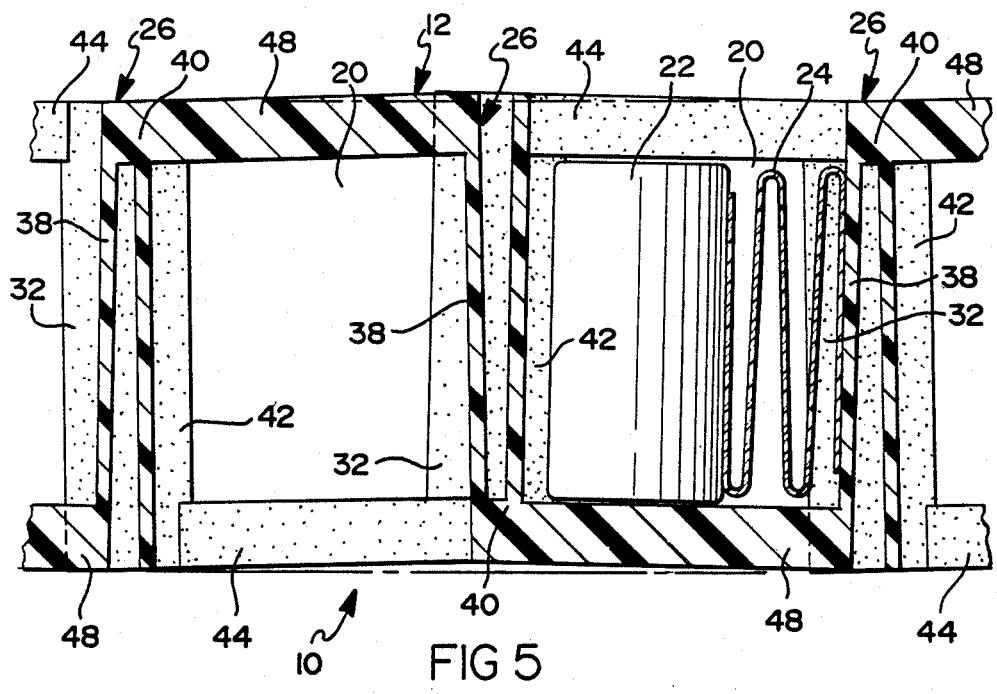

TEMPERATURE COMPENSATING ROLLER CLUTCH AND CAGE

This invention relates to roller clutches in general, and specifically to a roller clutch with a unitary molded plastic cage that compensates for the different rates of expansion and contraction of the plastic and the metal races between which it operates.

BACKGROUND OF THE INVENTION

Roller clutches are often used in automotive transmission applications to allow one direction only relative rotation between a pair of annularly spaced, substantial coaxial races. The clutch generally has a cage, which provides the basic structural framework of the cage, and which is sized so that it can be installed by insertion into the annular space between the races. It is convenient if the cage, rollers and roller energizing springs together constitute a secure and stable structural unit that can be easily handled at installation. While the races and the rollers are almost invariably steel, as they take considerable loads, there are many advantages to making the cage of plastic. Among the advantages of plastic cages are light weight, cost and ease of manufacture. The cage may be molded in one piece and, if designed in accordance with the principals discussed in U.S. Pat. No. 3,917,036 to Johnson et al, assigned to the assignee of the present invention, may even be by pass molded, that is, molded by only two dies that part along one line. Another advantage to plastic is that it provides good wear and friction characteristics when it is desired to mold the cage with journal blocks that fit closely between the races for concentricity control.

A disadvantage of the molded one piece plastic cage, however, is that the plastic will also typically have a thermal coefficient of expansion and contraction that is different from the steel. The plastic will expand more than the steel races with an increase from the nominal temperature, as well as shrink and contract more with a temperature decrease. Since the cage is often molded as a circumferentially complete and uninterrupted unit, it will expand and contract in proportion to its diameter. Consequently, the size of the cage and the annular space within which it must fit will tend to diverge, rather than remain matched in size. This is especially a problem with concentricity control cages, where there is less tolerance or play between the cage and the races, even at the nominal temperature. With an outer cam clutch, that is, a clutch where inner arcuate surfaces of the journal blocks ride closely on the cylindrical surface of the inner race, the great problem is the differential shrinkage that occurs with a temperature drop. The temperature differential may be quite large, since the nominal or build temperature of the races and cage is approximately seventy degrees F, but the clutch may see cold startup temperatures in the winter of twenty or thirty below. Since the cage will shrink and contract more, it can tightly constrict around the cylindrical surface of the inner race and undesirably increase the frictional force that the clutch must overcome in order to turn.

The problem noted above has been recognized in the art. The U.S. Pat. No. 4,570,762 to Husmann discloses a cage with a pair of parallel spaced side rails that have a plurality of connecting webs which, it is claimed, will facilitate elastic yielding of the cage to alleviate the differential thermal expansion problem. However, as is well known to those skilled in the art who have actually worked with and tested the various commercially available clutches, this particular approach has not gained wide acceptance. This is because of the fact that the side rails of the cage are still circumferentially complete and uninterrupted, and consequently very stiff. The cage as a whole, therefore, still expands and contracts in proportion to its diameter. An alternative approach to the problem that does work well is to create a cage which, instead of being molded as one circumferentially complete unit, is formed of separate, arcuate pieces that are flexibly joined together. This creates a cage which is not stiff and which accommodates itself very well to the annular space between the races. Its drawback is the relatively high manufacturing expense involved in separately molding and then assembling the separate pieces. The cage in Husmann, on the other hand can, at least theoretically, be molded more cheaply as an integral unit, although its particular design is not amenable to by pass molding.

A simpler solution to the problem of the stiffness that results from the circumferential continuity and completeness of a one piece cage has been suggested in Offenlegunshschrift DE No. 27 19 685 A1. There, a plastic cage of the concentric control, outer cam type has a plurality of axially extending, circumferentially spaced slots cut through the sides thereof, alternately extending from opposite axial sides of the cage. This creates a cage with substantially the flexibility of a separate piece cage, but one which is still, technically, one piece. The problem is that simply cutting slots into an existing one piece cage inevitably disturbs and interferes with its structural integrity, removing much of the advantage of being one piece. For example, in the cage disclosed in DE No. 27 19 685 A1, the slots are cut through the side rails and into the roller retention pockets, which are, therefore, no longer structurally complete, or as structurally sound. This could be especially harmful to the shipping and handling characteristics of the clutch, where it is typical to have the springs hold the rollers up against a roller rest surface side of the roller pocket. If the pocket is subject to shape change as the slots open and close, the springs and rollers could more easily fall out prior to installation of the clutch. Likewise, if slots are cut through the journal block portions of the cage, this would remove bearing area, and would cause the shape of the journal blocks to change with expansion and contraction of the cage, potentially affecting clutch performance after installation.

SUMMARY OF THE INVENTION

The invention provides a roller clutch with a novel cage that accommodates itself well to the thermal expansion and contraction problem described above, but without the above described drawbacks.

The unitary, plastic molded cage of the invention is part of a roller clutch that is, like most, installed in the annular space between a pair of relatively rotatable steel races. In the embodiment disclosed, the clutch is also the concentric control type, where the races are maintained in substantially coaxial relation by the cage itself. While a conventional, one piece plastic cage would tend to diverge from the annular space with changing temperature and bind on one of the races, the novel cage of the invention is designed to accommodate itself to the annular space without significantly affecting the basic structural integrity or shape of any part of the cage.

The cage of the invention is made up of a series of basic subunits which, in the embodiment disclosed, are each based upon a novel journal block. There is a generally evenly circumferentially spaced plurality of such journal blocks, each extending generally coaxially to the races and each having two axial ends that define the axial limits of the cage. One side of each journal block faces in one circumferential direction, while the other side faces in the opposite circumferential direction. Rather than being of a solid construction, as is conventional, each journal block is molded with an overhang and an underhang that extend from one side thereof in one circumferential direction, toward the other side of the adjacent journal block. The overhangs and underhangs on each journal block are radially spaced from one another and present an uninterrupted bearing area both above and below to keep the races spaced apart and in substantially coaxial relation to one another, as would conventional journal blocks.

Each of the journal blocks also has a cross rail integrally molded to one axial end thereof at a flexible hinge point. The cross rail extends from the hinge point generally parallel to the one side of the journal block, and is also located radially between the underhang and overhang of the same journal block. Those ends of the journal blocks to which the cross rails are molded alternate axially around the circumference of the cage, so the cross rails of adjacent journal blocks, while the same, extend in opposite axial directions. Located as they are between an overhang and underhang, the cross rails can flex unhindered at the hinge points toward or away from the journal blocks to which they are molded, independently of the overhangs and underhangs. Each of the journal blocks also has a pair of axially spaced, generally parallel side rails integrally molded to the other side thereof, that is, to the side of the journal block opposed to the side to which the cross rails are molded. The side rails extend in the opposite circumferential direction as far as to the cross rail of each adjacent journal block, thereby forming at least one structurally complete, four sided retention pocket for an energizing spring and roller. The spring in each such retention pocket is located with its base securely retained between the overhang and underhang of one journal block, and axially compressed against the cross rail that is between that overhang and underhang, eliminating the need for a spring latch. Each spring pushes a roller against the opposed side of the adjacent journal block, which provides a roller stop surface. The springs, rollers and cage are thereby all retained together as a sound and secure, easily handled unit prior to installation.

During operation of the clutch unit, as the cage and annular space tend to diverge with changing temperature, the retention pockets can move fairly freely toward and away from one another. This allows the cage to accommodate itself to the changing annular space. Specifically, with a temperature drop, the journal blocks and the cross rails molded thereto will flex apart at the hinge points as the cage shrinks, so that the cage will not constrict around and bind on the inner race. As the cage flexes, however, there is minimal or no effect on those surfaces of the journal blocks that keep the races spaced apart, that is, the overhangs and underhangs, since the cross rails flex independently thereof. There is minimal effect on the basic shape of the retention pockets, which remain structurally complete. The bases of the springs remain snug against the cross rails and confined radially between the overhangs and underhangs, as well.

It is, therefore, a basic object of the invention to provide a one piece molded roller clutch cage made up of a plurality of circumferentially adjacent subunits, each of which includes a structurally complete retention pocket, and in which the adjacent subunits are joined together at alternating hinge points so as to allow the subunits to move substantially freely circumferentially toward and away from one another with changing temperature, thereby allowing the cage to accommodate itself to the annular space in which the cage is located with minimal effect on the retention pockets.

It is another object of the invention to provide such a roller clutch cage that includes a plurality of novel journal blocks, each of which blocks includes an overhang and underhang molded to one side thereof so as to present uninterrupted bearing surfaces to the races, and in which the retention pockets include cross rails molded to alternating axial ends of the journal blocks and located radially between the overhangs and underhangs, thereby giving structurally complete retention pockets that can flex toward and away from one another independently of the journal blocks.

It is yet another object of the invention to provide a roller clutch with a cage of the type described in which the bases of the springs are also compressed against the cross rails and radially confined between the overhangs and underhangs both before and after installation.

DESCRIPTION OF THE PREFERRED EMBODIMENT

These and other objects and features of the invention will appear from the following written description, and from the drawings, in which:

FIG. 4 is a view similar to FIG. 1, but showing the cage at a reduced temperature;

FIG. 5 is a sectional taken along the line 5—5 of FIG. 4.

Figure 1:
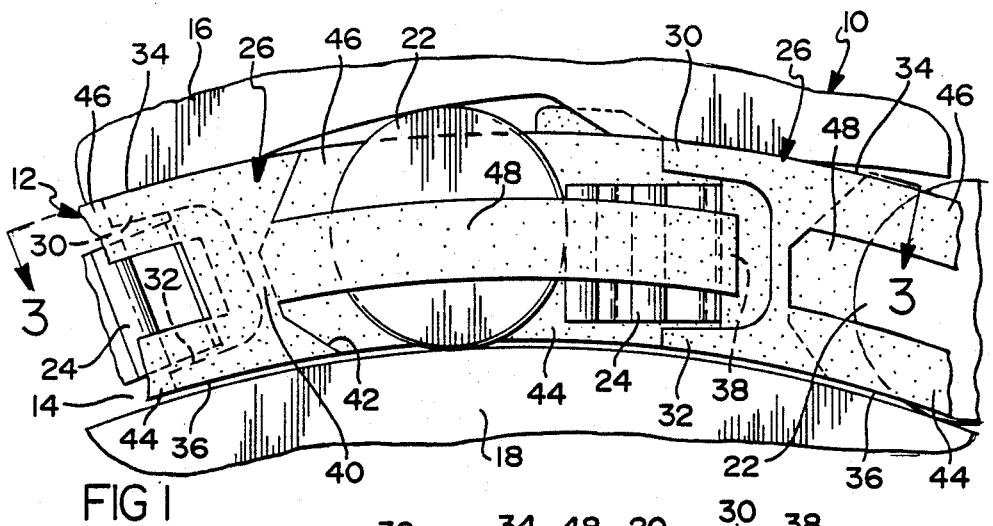
FIG. 1 is an end view of a portion of a pair of races with a roller clutch incorporating a preferred embodiment of the cage of the invention installed in the annular space between the races, at a nominal temperature.
Figure 2:
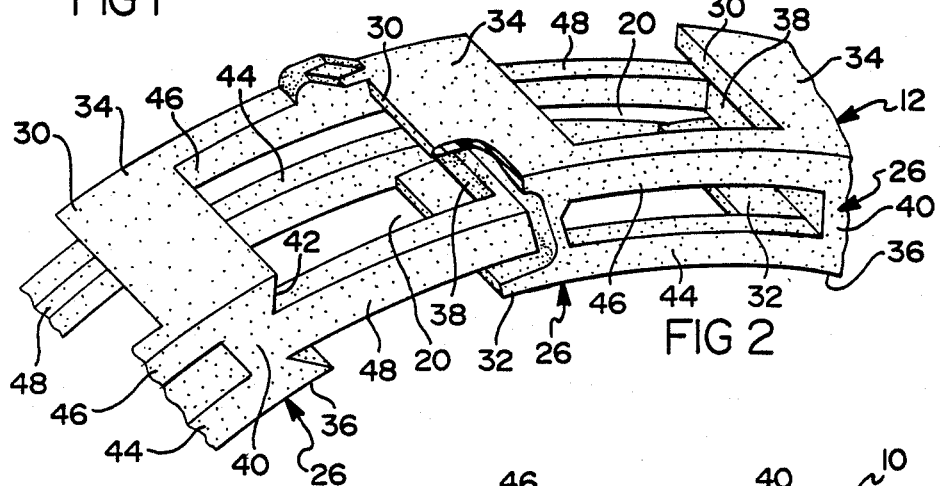
FIG. 2 is a perspective view of a portion of the cage before installation.

Referring first to FIGS. 1 and 2, a roller clutch 10 incorporating a preferred embodiment of the molded, unitary, plastic molded cage of the invention 12 is designed so as to be installed in the annular space 14 between a cam outer race 16 and a cylindrical inner race 18. Cage 12 provides an evenly circumferentially spaced series of retention pockets 20, which will be described in more detail below. Each retention pocket is designed to retain a wedging element, in this case a cylindrical steel roller 22, and its associated energizing spring 24. Clutch 10 is the type that is installed by the ringing in method, which is well known to those skilled in the art. Cage 12 is also the concentric control type, meaning that is sized so as to fit closely within the annular space 14 at the nominal or build temperature of around 70 degrees F., which is the situation illustrated in FIG. 1. Because of the close fit, part of cage 12 will ride on the cylindrical pathway of inner race 18 when it overruns relative to outer race 16 so as to keep the races 16 and 18 accurately annularly spaced and coaxial. Consequently, cage 12 is particularly vulnerable to the fact that the plastic of which it is molded has a different, larger coefficient of thermal expansion and contraction than the steel of races 16 and 18. Thus, with a significant temperature change from the nominal temperature, the size of cage 12 can change more rapidly, either growing with a temperature rise or shrinking with a temperature drop, than will the annular space 14. This divergence can lead to binding or buckling of cage 12 relative to one of the races 16 or 18. For example, with a large temperature drop, the more rapidly shrinking cage will tend to constrict around and bind on the cylindrical surface of the inner race 18, leading to greatly increased friction and torque in the clutch 10. The novel construction of cage 12 is intended to eliminate this problem, as will be described next.

Figure 3:
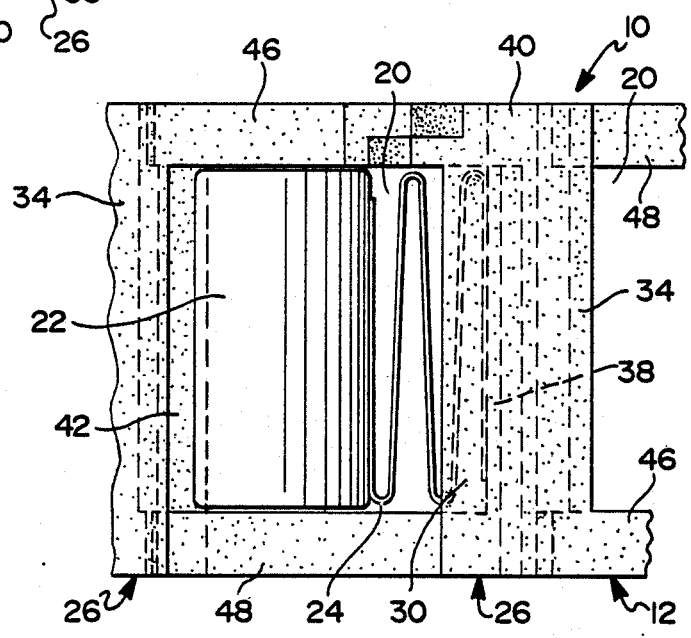
FIG. 3 is a view taken along the line 3—3 of FIG. 1, showing the cage at a nominal temperature.

Referring next to FIGS. 2 and 3, although cage 12 is a unitary structure that may be simply molded, it has a relatively complex shape. Cage 12 may be conceived of as an even plurality of basic subunits which, in the embodiment disclosed, are each based upon a novel journal block 26. There are sixteen journal blocks total in cage 12, one for each roller 22. Blocks 26 have a repeating pattern, so the illustration of the portion of cage 12 in FIG. 2 is enough to illustrate the entire cage 12. Each journal block 26 extends generally coaxially to the races 16 and 18, with the axially opposed ends thereof defining the axial limits of cage 12. Consequently, one side of each journal block 26 faces in one circumferential direction relative to the annular space 14, while the other side faces in the opposite circumferential direction. Rather than being of a solid construction, each novel journal block 26 is molded with an overhang 30 and a radially spaced underhang 32 extending from one side thereof in one circumferential direction, counterclockwise here. The partially cylindrical upper surface 34 of overhang 30 and the partially cylindrical lower surface 36 of underhang 32 represent the radial limits of cage 12, and provide the bearing surfaces that directly confront the surfaces of outer and inner races 16 and 18 respectively, as best seen in FIG. 2. The surfaces 34 and 36 of all of the journal blocks 26 together provide enough bearing area to keep the races 16 and 18 coaxial.

Referring now to FIGS. 2, 3 and 5, each journal block 26 also has a cross rail 38 integrally molded to one axial end thereof, extending generally parallel to and spaced from that side thereof to which the underhang 30 and overhang 32 are molded. The axial end of the journal blocks 26 to which the cross rails 38 are so molded alternate axially around the circumference of cage 12. Because the material of cage 12 is plastic and inherently somewhat elastic, a flexible hinge point 40 is formed between each journal block 26 and its associated cross rail 38, as best seen in FIG. 5. The side of each journal block 26 opposite the overhang 30 and underhang 32 is molded with a v shaped notch 42, which serves as a stop surface for roller 22. Each journal block 26 also is molded with a pair of axially spaced parallel side rails on that side of the block 26 opposite the overhang 30 and underhang 32 and extending in the opposite circumferential direction, or clockwise as shown here. Specifically, these are a lower side rail 44 and a coplanar upper side rail 46 extending from one axial end of each block 26, and a middle side rail 48 extending from the other end. The upper and lower side rails 44 and 46 and the middle side rail 48 alternate moving circumferentially around cage 12 and lie on non overlapping radii so as to allow cage 12 to be by pass molded. Each of the side rails 44, 46 and 48 extends as far as and is integrally molded to the cross rail 38 of the adjacent journal block 26, thereby creating the series of joined and structurally complete, four sided retention pockets 20 described above. Each spring 24 is assembled to cage 12 with its base radially retained between an overhang 30 and underhang 32 and axially compressed against a cross rail 38. Thus, the overhangs 30 and 32, in addition to their primary function of providing race spacing, cooperate with the cross rail 38 that they encompass to create a box for the base of spring 24, eliminating the need for a spring latch. Each spring 24 biases a roller 22 against the v notch rest surface 42 of the adjacent block 26, thereby retaining all clutch components together as a sound and secure, easily handled unit prior to installation.

Referring next to FIGS. 1, 4 and 5, the completed clutch 10 is then installed, just as a conventional clutch would be, in space 14. During clutch operation, as the cage 12 and annular space 14 tend to diverge in size, the cage 12 will automatically compensate. Because of the fact that the cross rail 38 is molded to an end of and parallel to a side of a journal block 26, it can flex out or back between the underhang 32 and overhang 30 independently, with no significant effect on the journal blocks 26. For example, with a falling temperature, cage 12 shrinks more rapidly than does annular space 14 and the journal block lower surfaces 36 move closer to the cylindrical surface of the inner race 18, the situation shown in FIGS. 4 and 5. As this relative divergence occurs, the retention pockets 20 can move fairly freely relative to each other, since the cross rails 38 can flex fairly freely away from their respective journal blocks 26 at the hinge points 40. This prevents the surfaces 36 from constricting around and binding strongly into the inner race 18, which could cause undesirable friction. As best seen in FIG. 5, as cage 12 so flexes, the general shape of the retention pockets 20 stays almost the same, since each cross rail 38, as it flexes away from the journal block 26 to which it is molded, remains essentially parallel to the journal block 26 to which it is adjacent. The roller pockets 20 remain structurally complete and closed on all four sides, as there are no slots invading them which open up. The cross rail 38 does not flex enough to move out from between the overhang 30 and underhang 32 between which it lies, so the retention of spring 24 is not jeopardized. Each spring 24 remains completely enclosed, and while its compression will increase slightly, its direction will remain stable, since the shape of the, roller pockets 20 is stable. Since the hinge points 40 axially alternate and are even in number, cage 12 does not bell mouth or open up more on one axial side than another, but rather flexes symmetrically. There is minimal or no effect on the surfaces 34 and 36, as they, too, are invaded by no opening slots. Any axial skew of one block 26 that occurs as the pockets 20 tip relative to one another at the hinge points 40 is matched by an opposing skew of the adjacent block 26, since there is and even number of alternating hinge points 40. Therefore, the concentricity control feature of cage 12 is not substantially affected. The advantage of temperature compensation is had at essentially no cost to the basic structural integrity or operation of the unitary cage 12, as compared to a conventional cage.

Variations of the preferred embodiment could be made within the spirit of the invention. For example, each subunit might consist not of a single roller pocket, but of two or more, in a case where each journal block 26 was not directly adjacent to another just like it, but had an intervening solid, conventional journal block between it and the next novel journal block 26. So long as there was an even number of such subunits joined together by the axially alternating hinge points 40, the same type of flexibility would exist, although a cage so configured might not be as flexible. Still, for many applications, it might be flexible enough, and would allow an odd number of rollers to be accommodated, although there would still be an even number of subunits as they are defined, and thus an even number of the jointing hinge points. The location of the cross rails 38 directly radially between the underhangs 32 and overhangs 30 is not absolutely necessary to the flexibility per se. That is, the cross rails 38 could be shifted somewhat to left as viewed in FIG. 1, so that they were not encompassed by the overhangs 30 and underhangs 32. Such a cage would still have structurally complete, four side roller pockets 20, which would still remain complete and still be flexible. However, the roller pockets 20 would not have as much circumferential length, given the same cage diameter, nor would the spring bases have the same confining box cooperatively provided by the fact that the cross rail 38 is located directly radially between the overhangs 30 and underhangs 32, which is a real advantage. In a case where concentricity control was not needed, but flexibility was still needed, a more basic structure would work. Such a basic cage could include an even number of subunits made up of four sided, complete roller pockets, in which each roller pocket had two axially spaced side rails joining first and second circumferentially spaced cross rails, and with a first cross rail of each such subunit being adjacent to, spaced from, and joined to a second cross rail of an adjacent subunit at a flexible hinge point. So long as the hinge points were axially alternating, the same flexibility, without disruption of the integrity of the roller pockets, would occur. Therefore, it will be understood that the invention is not intended to be limited to just the embodiment disclosed.

The embodiments of the invention in which an exclusive property or privilege is claimed are defined as follows:

1. A unitary cage for a one way clutch that has a complement of spring energized wedging elements located in an annular space between a pair of relatively rotatable members and in which the material of said cage and said rotatable members have differing coefficients of thermal expansion and contraction, so that the size of said annular space and the size of said cage tend to diverge with changing temperature, said unitary cage comprising, an even plurality of adjacent subunits arranged in a generally circular pattern, each subunit including a pair of axially spaced, generally parallel side rails and first and second circumferentially spaced, generally parallel cross rails interconnecting said side rails so as to provide at, least one structurally complete four-sided retention pocket, said at least one retaining pocket being completely enclosed on all four sides, said subunits further being arranged with a first cross rail of each subunit circumferentially spaced from a second cross rail of each adjacent subunit, said first and second circumferentially spaced cross rails further being connected to one another at axially alternating hinge points so as to create an integral unit, and so that said circumferentially adjacent first and second cross rails can flex circumferentially toward and away from one another about said hinge points, whereby, as said cage and annular space tend to diverge with changing temperature, said subunits can move substantially freely circumferentially toward and away from one another as said adjacent first and second cross rails flex about said axially alternating hinge points, thereby allowing said cage to accommodate itself to said annular space with minimal effect on the basic shape of said retention pockets.

2. A unitary cage for a one way roller clutch that has a complement of spring energized rollers located in an annular space between a pair of relatively rotatable races that require a means to maintain said races substantially coaxial to one another as they rotate, and in which the material of said cage and said races have differing coefficients of thermal expansion and contraction, so that the size of said annular space and the size of said cage tend to diverge with changing temperature, said unitary cage comprising, an even plurality of circumferentially spaced and axially extending journal blocks each having an overhang with an uninterrupted surface that confronts one race and an underhang with an uninterrupted surface that confronts the other race integrally molded to one side thereof and extending in one circumferential direction, said overhangs and underhangs being radially spaced from one another to support said races in substantially coaxial relation to one another as said clutch operates, said journal blocks each also having a cross rail integrally and flexibly molded to alternating axial ends thereof and extending generally parallel to and spaced from said one side thereof and located radially between said underhang and overhang, so that said journal blocks and cross rails can flex relative to each other independently of said overhangs and underhangs, each of said journal blocks also having a pair of axially spaced, generally parallel side rails integrally molded to the other side thereof and extending in the opposite circumferential direction to the cross rails of each adjacent journal block so as to form at least one structurally complete four sided retention pocket, said at least one retaining pocket being completely enclosed on all four sides, and connect all of said journal blocks together as a unit, whereby, as said cage and annular space tend to diverge with changing temperature, said retention pockets can move circumferentially toward and away from one another as said journal blocks and cross rails flex relative to each other, thereby allowing said cage to accommodate itself to said annular space with minimal effect on the basic shape of said retention pockets and with minimal effect on said journal blocks.

3. A one way clutch that has a caged complement of energized rollers adapted to be installed in an annular space between a pair of relatively rotatable races that require a means to maintain said races substantially coaxial to one another as they rotate, and in which the material of said cage and said races have differing coefficients of thermal expansion and contraction, so that the size of said annular space and said cage tend to diverge with changing temperature, said clutch comprising, a cage including an even plurality of circumferentially spaced and axially extending journal blocks, said journal blocks each having an overhang with an uninterrupted surface that confronts one race and an underhang with an uninterrupted surface that confronts the other race integrally molded to one side thereof and extending in one circumferential direction toward a stop surface of said cage, said overhangs and underhangs, being radially spaced from one another to support said races in substantially coaxial relation to one another as said clutch operates, said journal blocks each also having a cross rail integrally and flexibly molded to alternating axial ends thereof and extending generally parallel to and spaced from said one side thereof and located radially between said underhang and overhang so that said journal blocks and cross rails can flex relative to each other independently of said overhangs and underhangs, each of said journal blocks also having a pair of axially spaced, generally parallel side rails integrally molded to the other side thereof and extending in the opposite circumferential direction to the cross rails of each adjacent journal block so as to form at least one structurally complete four-sided retention pocket, said at least one retaining pocket being completely enclosed on all four sides, therewith and connect all of said journal blocks together as a unit, a complement of rollers, each contained in a respective retention pocket, and, a plurality of energizing springs, contained in a respective retention pocket and resiliently compressed between said cross rail and said roller so as to urge said roller toward said cage stop surface, whereby, prior to installation, said springs are radially retained between said overhangs and underhangs as they resiliently retain said rollers against said cage stop surfaces so as to create an easily handled until, while after installation, as said cage and annular space tend to diverge with changing temperature, said retention pockets can move substantially freely circumferentially toward and away from one another as said journal blocks and cross rails flex relative to each other while said springs remain radially confined between said overhangs and underhangs, thereby allowing said cage to accommodate itself to said annular space with minimal effect on the basic shape of said retention pockets and with minimal effect on said journal blocks.

* * * * *